United States Patent [19]

Bartges et al.

[11] Patent Number: 5,554,428
[45] Date of Patent: Sep. 10, 1996

[54] MEMORY DISK SHEET STOCK AND METHOD

[75] Inventors: Charles W. Bartges, Delmont; Robert W. Hayland, Jr., Oakmont; Craig J. Jensen, Pittsburgh; Steven F. Baumann, Penn Hills, all of Pa.

[73] Assignee: Aluminum Company of America, Pittsburgh, Pa.

[21] Appl. No.: 299,836

[22] Filed: Sep. 1, 1994

(Under 37 CFR 1.47)

[51] Int. Cl.$^6$ ............................................. B32B 3/00
[52] U.S. Cl. .................. 428/64.1; 428/64.2; 428/64.3; 428/64.4; 428/65.3; 428/457; 428/688; 428/689; 428/694 R; 428/694 ST
[58] Field of Search ................... 428/457, 694 R, 428/694 ML, 694 ST, 688, 689, 64.1, 64.2, 64.3, 65.3, 65.6

[56] References Cited

U.S. PATENT DOCUMENTS

| | | | |
|---|---|---|---|
| 3,619,181 | 11/1971 | Willey | 75/138 |
| 4,681,813 | 7/1987 | Yamada | 428/450 |
| 4,699,672 | 10/1987 | Westerman | 148/12.7 |
| 4,722,872 | 2/1988 | Westerman | 428/654 |
| 4,751,958 | 6/1988 | Flowers et al. | 164/473 |
| 4,825,680 | 5/1989 | Coe et al. | 72/359 |
| 4,898,774 | 2/1990 | Yamashita et al. | 428/336 |
| 5,209,835 | 5/1993 | Makino et al. | 204/192.16 |
| 5,211,910 | 5/1993 | Pickens et al. | 420/532 |
| 5,377,141 | 12/1994 | Takemura | 365/160 |

*Primary Examiner*—Patrick Ryan
*Assistant Examiner*—Elizabeth Evans
*Attorney, Agent, or Firm*—Gary P. Topolosky

[57] ABSTRACT

There is disclosed an improved memory disk stock comprised of an alloy composition which includes: about 1–11 wt. % magnesium, preferably between about 2–7 wt. % Mg; up to about 0.3 wt. % zirconium, preferably about 0.02–0.25 wt. % Zr; up to about 0.2 wt. % iron, up to about 0.2 wt. % silicon, and about 0.05–1 wt. % of a dispersoid-forming element selected from scandium, erbium, thulium, lutetium, ytterbium, hafnium and yttrium, the balance aluminum and incidental elements and impurities. With preferably about 0.1–0.45 wt. % of scandium added to such compositions, these disk stocks exhibit a two- to three-fold increase in strength over the same compositions without any scandium added. They result in magnetic media recording devices having improved temperature resistance with average yield strengths of 30 ksi or more. There is also claimed an improved method for making such memory disk devices.

22 Claims, No Drawings

MEMORY DISK SHEET STOCK AND METHOD

BACKGROUND OF THE INVENTION

This invention relates to the field of magnetic disk substrates. More particularly, the invention relates to an improved aluminum-based alloy memory disk sheet stock, magnetic recording substrate products made therefrom and a related method for making such memory disk products.

The hard magnetic disks used as memory media for data storage in computers require an extremely high quality material. Aluminum, specifically aluminum alloys, are a metal of choice, due to the relatively high strength, light weight, low cost and good surface finishing characteristics of such alloys. Aluminum-magnesium alloys have been used for some time as substrates for the magnetizable layers of many memory disks. U.S. Pat. Nos. 4,699,672, 4,722,872 and 4,751,958 are representative of the magnesium-containing, aluminum-based alloys used for such memory storage devices. Various ways to manufacture such sheet products are disclosed in these references. Some of the more common aluminum-based alloys currently used for this purpose include 5082, 5086 and 5182 aluminum (Aluminum Association designations). These alloys all have about 4 wt. % magnesium and some amount of manganese added thereto.

Advances in memory storage technology may necessitate further reductions in thickness and/or size of the magnetizable disk, or at least the magnetizable layers deposited on a disk substrate. At the same time, new technologies demand an increase in the density of information storable per disk.

SUMMARY OF THE INVENTION

It is a principal objective of this invention to provide an aluminum memory disk sheet stock with an improved combination of properties, especially platability, flatness retention and higher strengths, in excess of 30 ksi and, more preferably, about 40 ksi or better. It is another main objective of this invention to consistently impart such improved properties to memory disk stock so as to enable the designers of future computer and other magnetic media storage devices to accommodate smaller, thinner disks which can store the same or even greater amounts of information thereon.

It is yet another main objective of the present invention to provide a stronger magnesium-containing, aluminum-based alloy disk substrate which may be shrunk in size and/or thickness because of the strength gains otherwise achieved. Yet another main objective is to provide aluminum-based memory disk stock with an ability to maintain its flatness better and longer, especially through higher thermal treatment temperatures. Still another main objective is to strengthen existing compositions used in the manufacture of aluminum-magnesium memory disks so as to make such products less vulnerable to damage during subsequent processing and/or end use.

These and other objectives are met or exceeded by the present invention, one embodiment of which pertains to an improved memory disk stock comprised of an alloy composition which includes: about 1–11 wt. % magnesium, preferably between about 2–7 wt. % Mg; up to about 0.3 wt. % zirconium, preferably between about 0.02–0.25 wt. % Zr; up to about 0.2 wt. % iron, preferably less than about 0.03 wt. % Fe; up to about 0.2 wt. % silicon, preferably less than about 0.05 wt. % Si; and about 0.05–1 wt. % of an element which forms a recrystallization-inhibiting compound, said element selected from the group consisting of scandium, erbium, thulium, lutetium, ytterbium, hafnium and yttrium, the balance aluminum and incidental elements and impurities. Preferably, about 0.1–0.45 wt. % of scandium exists in the alloy compositions of this invention. Magnetic media recording devices formed from these disk sheet stock have average yield strengths of about 30 ksi or more, typically in excess of 40 ksi. There is also claimed an improved method for making memory disk devices by adding about 0.05–1 wt. % of scandium, erbium, thulium, lutetium, ytterbium, hafnium and/or yttrium to new or existing magnesium-containing, and preferably zirconium-containing, aluminum-based alloys.

DETAILED DESCRIPTION OF PREFERRED EMBODIMENTS

For the description of alloy compositions that follows, all references to percentages are by weight percent (wt. %) unless otherwise indicated. When referring to any numerical range of values, such ranges are understood to include each and every number and/or fraction between the stated range minimum and maximum. A range of about 0.1–1 wt. % scandium, for example, would expressly include all intermediate values of about 0.11, 0.12, 0.13 and 0.2%, all the way up to and including 0.98, 0.99 and 1.00 wt. % Sc. The same applies to each other elemental range set forth below.

As used herein, the term "substantially-free" means no significant amount of that component has been purposefully added to the alloy, it being understood that trace amounts of incidental elements and/or impurities may still find their way into a desired end product. For example, a substantially lead-free, disk sheet stock may contain less than about 0.1% Pb, or less than about 0.03% Pb on a more preferred basis, due to contamination from incidental additives or through contact with certain processing and/or holding equipment. All embodiments of the present invention are substantially Pb-free. The invention alloy is also substantially free of bismuth, nickel, vanadium, beryllium, cadmium and thallium on a most preferred basis.

While this detailed description focuses on adding scandium to new or existing aluminum-based, memory disk stock, it is to be understood that the invention should not be limited to this metal addition alone. As used herein, scandium is a representative "rare earth metal" even though it doesn't appear with the other lanthanide metals listed in Group IIIB of the Periodic Table. Nor is yttrium automatically grouped with this same series of elements even though it often performs the same function as scandium, or other "true" rare earths in an alloy composition. It is believed that minor amounts of still other rare earths, like erbium, thulium, lutetium, ytterbium, or another rare earth "act-alike", like hafnium, may be substituted for, or possibly even combined with scandium (or with each other) in varying quantities to achieve the substantial strength level improvements observed herein. For at least one particular aluminum-magnesium alloy, a two- to three-fold increase in strength was observed for the same composition made with scandium versus that same composition without any scandium added thereto.

In the same way, this invention focuses on making improved substrates for magnetic media recordation, i.e., memory disks and the like. In practice, that means forming the entire body of a disk whose outer surface may have a thin metal, metal oxide or even polymer component applied thereon. It is to be understood, however, that the metal compositions of this invention may also be used in conjunction with existing or currently developmental disk manufacturing techniques, including but not limited to making disks from metal clad products and/or from gradient components as in a spray formed product whose composition changes either through the thickness of the product, from its inner to its outer circumference, or both.

"Platability", as used herein, means the ability of an aluminum disk substrate to allow electro- or electroless plating solutions and/or pretreatments to be deposited thereon so as to form a smooth deposit layer on an outer surface of this substrate, said deposit layer being substantially free of pits and other surface defects.

When referring to preferred aging, annealing and/or tempering treatments for this invention, including but not limited to: H19, H1X, H2X, H3X, or T6, T8, T851 and T9 tempers, it is understood that current practices include: hot working; cold working; and precipitation hardening, either at room or ambient temperatures (i.e. naturally) or artificially (using an external heat source) for effecting a partial anneal thereof. Particulars about such annealing and/or tempering processes can be found in Aluminum Association guidelines, like the *Aluminum Standards and Data* 1993 publication which is fully incorporated by reference herein.

While not being limited to any particular theory, it is believed that this invention manages to impart significantly higher strengths to memory disk stock through the addition of certain rare earths or rare earth "act alikes", preferably scandium, by causing rare earth-rich precipitates to form, said precipitates having the ability to store and resist plastic deformation and, due to the relatively small size and fine distribution of these particles, recovery and recrystallization of the resulting alloy are inhibited. The same alloy is also more temperature resistant than the same alloy which is devoid of scandium or scandium-like additives. By "temperature resistant" or "temperature resistance", it is meant that a large portion of the strength and structure imparted by working this alloy is retained in the memory disk substrate, even after exposure to one or more higher temperatures, typically above about 450° F., such as during subsequent flattening operations or the like. Specimens of this disk sheet stock have been examined by mechanical testing and subjected to microstructural analysis to observe this feature.

When referring to the main alloying components of this invention, it is understood that a remainder of substantially aluminum may include some incidental, intentionally added elements which may affect collateral properties of the invention, or unintentionally added impurities, neither of which should change the essential characteristics of this alloy. With respect to these main alloying elements of the more preferred embodiments of this invention, it is believed that magnesium contributes to strain hardening and strength. Scandium contributes to the artificial aging response of memory disk products made from the present invention. And zirconium additions are believed to improve the resistance of scandium precipitates to rapid growth in preferred embodiments of this alloy. Together, the scandium and zirconium serve yet another purpose. When added to aluminum-magnesium alloys of the type described herein, scandium will precipitate to form a dispersion of fine, intermetallic particles (referred to as "dispersoids"), typically of an $Al_3X$ stoichiometry, with X being Sc, Zr or both Sc and Zr in the case of scandium and zirconium additions. $Al_3Sc$ dispersoids impart some strength benefit as a precipitation-hardening compound, but more importantly, such dispersoids are very efficient at retarding the process of recovery and recrystallization. These processes are impeded by a phenomenon that is sometimes called the "Zener Drag" effect. [See generally, C. S. Smith, TMS-AIME, 175, 15 (1948).] It results because the scandium dispersoids are very small in size, but also large in number. They generally retard recovery and recrystallization by acting as pinning points for migrating grain boundaries and dislocations which must bypass them in order for the metal to soften. Recrystallization and recovery are the principal metallurgical processes by which such strain hardenable alloys soften. In order to "soften" an alloy having a large population of $Al_3Sc$ particles, one would have to heat the material to much higher temperature than would be required for an alloy not having such particles present. Put another way, when identically strain-hardened and annealed, a sheet product (or in this case memory disk stock) that contains $Al_3Sc$ dispersoids will have higher strength levels than a comparable alloy without any scandium present. For memory disks, a further benefit is this sheet product's ability to resist softening through the high temperature thermal exposures usually needed to flatten sheet product of this sort and then sputter magnetic media on the substrate. In so doing, the invention alloy will retain some of the strengths it acquired through the rolling operations performed thereon. Other prior art alloys, without Sc added thereto, tend to soften through these same flattening treatments thus yielding a lower strength, final product. An added benefit of zirconium is its ability to limit the growth of $Al_3(Sc, Zr)$ particles to assure that such dispersoids remain small, closely spaced and capable of producing the Zener Drag effect.

It is preferred to minimize the effects of certain impurities in these alloy compositions. Impurities, like iron and silicon, can have a deleterious effect on the quality of memory disks produced from this feedstock, especially if the memory disk substrate is to be plated. They are less critical where no subsequent plating is anticipated. In any event, it is preferred that Fe and Si levels be kept especially low, below 0.5 wt. % each, preferably below about 0.1 wt. % each, and most preferably at or below about 0.03 wt. % for iron and about 0.05 wt. % for silicon.

On a less preferred basis, the alloy disk stock of this invention may have readily observable strength level improvements imparted to it through the additions of scandium, erbium, thulium, lutetium, ytterbium, hafnium and/or yttrium when these same alloys contain such staple alloying components as zinc, up to about 5 wt. %, typically for natural or artificial aging response enhancement, and up to about 1 or 2 wt. % copper for improving that alloy's precipitation and solid solution strengthening performance. For these reasons, it is considered appropriate to more generally identify the present invention by its broadest, most generic form, namely, adding one or more dispersoid-forming, rare earth metal, preferably scandium, or rare earth metal "act alikes" to a new or existing aluminum-based memory disk stock product composition.

In the typical processing of memory disks from alloy stock, there are included the usual steps of: (a) providing an aluminum-based alloy; (b) making thin sheet product from this alloy, by casting, rolling, or perhaps even spray forming; (c) cutting or stamping (or sometimes called "blanking") disk substrates from the thin sheet product; and finally (d) converting said disk substrates into computer memory disks, usually by an elaborate number of substeps including flattening, polishing and/or thermally heat treating the final product.

The typical sizes of aluminum-based memory products manufactured today range from about 1 to 5 inches in overall diameter and from about 0.020–0.100 inch in overall thickness. While it cannot be predicted to what extent these sizes and/or thicknesses may be reduced by future disk storage designers, it is believed that the strength increase imparted through the addition of scandium according to this invention will give such designers enhanced flexibility in how they conceive and produce future magnetic data storage media.

When platability of an intermediate product does not meet specification, there is a certain amount of grinding which can be performed on a disk to reduce its high points and bring its overall outer surface into a more uniform, useable state. Alternately, it may be possible to thermally flatten a product by heat treating to reduce or preferentially eliminate any residual stresses in the substrate which may be detrimental to its flatness. Such a treatment may be performed in that alloy product's annealing temperature range, generally from about 500°–750° F. for most 5XXX or 7XXX Series aluminum alloys, sometimes with a number of noncomplying disks stacked together under compression.

The following example is provided to further illustrate the objectives and advantages of this invention. It is not intended to limit the scope of the present invention in any manner, though.

EXAMPLE

Thin plate product of an alloy composition analyzed to contain 4.11 wt. % magnesium, 0.22 wt. % scandium, 0.09 wt. % zirconium, 0.03 wt. % iron and 0.05 wt. % silicon, the balance aluminum and incidental elements and impurities was cast and then rolled to a final gauge of 0.020 inch. Portions of this product were then divided and subjected to various thermal treatment conditions. A first sample was exposed to 7 hours at 625° F., a fairly standard heat treatment for products of this sort. The ultimate tensile and yield strengths of this sample were then measured at 52.0 ksi and 44.7 ksi, respectively, as compared to average tensiles of about 15–20 ksi for non-scandium containing, aluminum-magnesium alloy products similarly heat treated. A second sample of this same product, aged for 6 hours at 700° F., produced an ultimate tensile strength of 51.6 ksi and yield strength of 37.9 ksi.

Having described the presently preferred embodiments, it is to be understood that the invention may be otherwise embodied within the scope of the appended claims.

What is claimed is:

1. A memory disk sheet stock having improved strength levels, said memory disk stock comprising an alloy composition which consists essentially of about 1–11 wt. % magnesium, up to about 5 wt. % zinc, up to about 1 wt. % copper, up to about 0.3 wt. % zirconium, up to about 0.2 wt. % iron, up to about 0.2 wt. % silicon, and about 0.05–1 wt. % of a dispersoid-forming element selected from the group consisting of: scandium, erbium, thulium, lutetium, ytterbium, hafnium and yttrium, the balance aluminum and incidental elements and impurities.

2. The memory disk sheet stock of claim 1 which has an average yield strength greater than about 30 ksi.

3. The memory disk sheet stock of claim 2 which has an average yield strength greater than about 40 ksi.

4. The memory disk sheet stock of claim 1 wherein the dispersoid-forming element is scandium.

5. The memory disk sheet stock of claim 6 which contains about 0.1–0.45 wt. % scandium.

6. The memory disk sheet stock of claim 1 which contains about 2–7 wt. % magnesium and less than about 0.1 wt. % zirconium.

7. The memory disk sheet stock of claim 1 which contains less than about 0.03 wt. % iron and less than about 0.05 wt. % silicon.

8. A magnetic recording disk substrate comprising an alloy composition which consists essentially of about 1–11 wt. % magnesium, about 0.02–0.3 wt. % zirconium, up to about 5 wt. % zinc, up to about 1 wt. % copper, up to about 0.2 wt. % iron, up to about 0.2 wt. % silicon, and about 0.05–1 wt. % scandium, the balance aluminum and incidental elements and impurities.

9. The disk substrate of claim 8 which has an average yield strength greater than about 30 ksi.

10. The disk substrate of claim 9 which has an average yield strength greater than about 40 ksi.

11. The disk substrate of claim 8 which contains about 0.1–0.45 wt. % scandium.

12. The disk substrate of claim 8 which contains about 2–7 wt. % magnesium and less than about 0.1 wt. % zirconium.

13. The disk substrate of claim 8 which contains less than about 0.03 wt. % iron and less than about 0.05 wt. % silicon.

14. In a method for making computer memory disks from a magnesium-containing aluminum-based alloy composition, said method comprising the steps of: (a) providing an aluminum-based alloy having at least about 2 wt. % magnesium; (b) making thin sheet product from said aluminum-based alloy; (c) cutting disk substrates from said thin sheet product; and (d) converting said cut disk substrates into computer memory disks, the improvement which comprises adding to said aluminum-based alloy between about 0.05–1 wt. % of an element selected from the group consisting of: scandium, erbium, thulium, lutetium, ytterbium, hafnium and yttrium to improve the temperature resistance of memory disks made therefrom.

15. The improvement of claim 14 wherein said included element is scandium.

16. The improvement of claim 14 wherein said aluminum-based alloy contains about 0.1–0.45 wt. % of scandium.

17. The improvement of claim 14 wherein said memory disks have an average yield strength of about 30 ksi or more.

18. The improvement of claim 17 wherein said memory disks have an average yield strength of about 40 ksi or more.

19. In a method for making computer memory disks from a magnesium-containing aluminum-based alloy composition, said method comprising the steps of: (a) providing an aluminum-based alloy having at least about 2 wt. % magnesium; (b) making thin sheet product from said aluminum-based alloy; (c) cutting disk substrates from said thin sheet product; and (d) converting said cut disk substrates into computer memory disks, said method also including exposing memory disks to processing temperatures greater than about 450° F., the improvement which comprises adding to said aluminum-based alloy between about 0.05–1 wt. % of an element selected from the group consisting of: scandium, erbium, thulium, lutetium, ytterbium, hafnium and yttrium to improve the temperature resistance of memory disks made therefrom.

20. The improvement of claim 19 wherein said included element is scandium.

21. The improvement of claim 19 wherein said aluminum-based alloy contains about 0.1–0.45 wt. % of scandium.

22. In a method for making computer memory disks from a magnesium-containing aluminum-based alloy composition, said method comprising the steps of: (a) providing an aluminum-based alloy having at least about 2 wt. % magnesium; (b) making thin sheet product from said aluminum-based alloy; (c) cutting disk substrates from said thin sheet product; and (d) converting said cut disk substrates into computer memory disks, said method also including exposing memory disks to processing temperatures greater than about 450° F., the improvement which comprises adding to said aluminum-based alloy about 0.05–1 wt. % scandium to improve the temperature resistance of memory disks made therefrom.

* * * * *